United States Patent
Li et al.

(10) Patent No.: US 12,451,906 B2
(45) Date of Patent: Oct. 21, 2025

(54) RADIO FREQUENCY UNIT, ANTENNA, AND SIGNAL PROCESSING METHOD

(71) Applicant: HUAWEI TECHNOLOGIES CO., LTD., Guangdong (CN)

(72) Inventors: Xianghua Li, Shanghai (CN); Zhongming Qin, Shanghai (CN); Xin Yu, Shenzhen (CN); Guanxi Zhang, Shanghai (CN); Jianping Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 337 days.

(21) Appl. No.: 18/323,000

(22) Filed: May 24, 2023

(65) Prior Publication Data
US 2023/0299797 A1    Sep. 21, 2023

Related U.S. Application Data

(63) Continuation of application No. PCT/CN2021/133033, filed on Nov. 25, 2021.

(30) Foreign Application Priority Data

Nov. 26, 2020 (CN) .......................... 202011347343.7

(51) Int. Cl.
*H04B 1/52* (2015.01)
*H04B 1/00* (2006.01)

(52) U.S. Cl.
CPC ......... *H04B 1/0057* (2013.01); *H04B 1/0003* (2013.01); *H04B 1/0096* (2013.01)

(58) Field of Classification Search
CPC .. H04B 1/0057; H04B 1/0003; H04B 1/0096; H04B 1/16; H03F 2200/294; H03F 1/56; H03F 2200/111; H03F 2200/451; H03F 2203/7209; H03F 2203/7239; H03F 3/24; H03F 3/72; H03F 3/189; H03F 1/20; H03F 1/26; H03H 17/02
USPC ...................................................... 455/552.1
See application file for complete search history.

(56) References Cited

U.S. PATENT DOCUMENTS

| | | | |
|---|---|---|---|
| 9,325,553 B2 * | 4/2016 | Kaukovuori | ......... H04J 11/0063 |
| 2018/0205413 A1 * | 7/2018 | Patel | ......................... H03F 3/19 |
| 2024/0072455 A1 * | 2/2024 | Kronfeld | .............. H04B 1/0064 |

FOREIGN PATENT DOCUMENTS

| | | | | |
|---|---|---|---|---|
| CN | 105634705 A | 6/2016 | | |
| CN | 106656243 A | 5/2017 | | |
| CN | 109274381 A | * | 1/2019 | ............... H04B 1/40 |

* cited by examiner

*Primary Examiner* — Tanmay K Shah
(74) *Attorney, Agent, or Firm* — WOMBLE BOND DICKINSON (US) LLP

(57) ABSTRACT

Embodiments of this application disclose a radio frequency unit, an antenna, and a signal processing method. The method includes: receiving an uplink signal in a downlink slot, where the uplink signal includes signals of N frequency bands; filtering and amplifying the signals of the N frequency bands; converting the uplink signal into a digital intermediate frequency signal; and then processing the digital intermediate frequency signal.

20 Claims, 9 Drawing Sheets

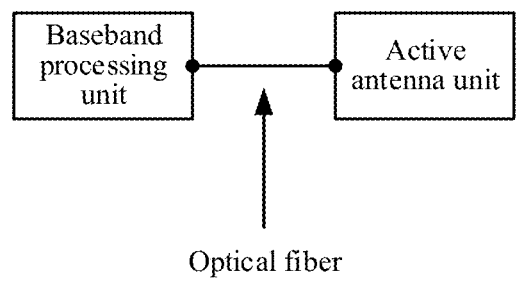
FIG. 1a
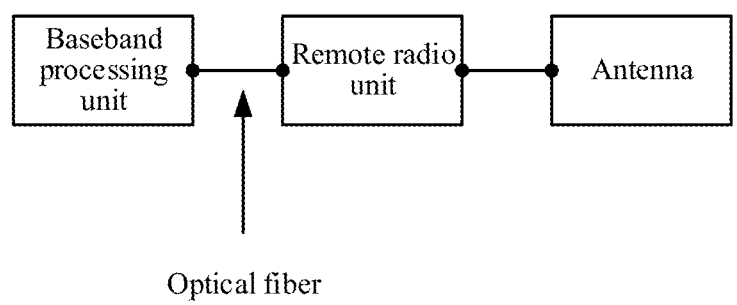
FIG. 1b
| Carrier A | D | D | D | D | D | D | D | S | U | U |
| Carrier B | D | D | D | D | D | D | S | U | U | U |
FIG. 2

RADIO FREQUENCY UNIT, ANTENNA, AND SIGNAL PROCESSING METHOD

CROSS-REFERENCE TO RELATED APPLICATIONS

This application is a continuation of International Application No. PCT/CN2021/133033, filed on Nov. 25, 2021, which claims priority to Chinese Patent Application No. 202011347343.7, filed on Nov. 26, 2020. The disclosures of the aforementioned applications are hereby incorporated by reference in their entireties.

TECHNICAL FIELD

Embodiments of this application relate to the communications field, and in particular, to a radio frequency unit, an antenna, and a signal processing method.

BACKGROUND

With the development of mobile communication, applications emerge such as live streaming on mobile phones, high-definition video streaming on telephone stations, new media live streaming, camera monitoring, and real-time upload of factory production line data. These applications upload data in real time through mobile communication, and have increasingly high requirements on an uplink experience, an uplink rate, and an uplink latency.

For a new radio (NR) system of current 5th generation mobile communication (5G), there are two standards: a frequency division duplex (FDD) standard and a time division duplex (TDD) standard. The TDD standard is a technique in which transmission of a downlink signal and an uplink signal is implemented in a same frequency band in a time division mode. In some embodiments, user equipment sends the uplink signal to a base station in an uplink slot, and the base station sends the downlink signal to the user equipment in a downlink slot.

However, in a TDD system, a proportion of downlink slots is larger than that of uplink slots. When working in the downlink slot, the TDD system cannot receive the uplink signal, resulting in a large latency.

SUMMARY

In some embodiments, this application provides a radio frequency unit. The radio frequency unit includes: a multiplexer, a low noise amplifier, a radio frequency analog-to-digital converter, and a digital intermediate frequency module. The multiplexer includes N filters, where N is an integer greater than 1, and the multiplexer is configured to filter an uplink signal from an antenna in a downlink slot, to obtain a filtered uplink signal, where the uplink signal includes signals of N frequency bands. After the multiplexer filters the uplink signal, the low noise amplifier may amplify the filtered uplink signal, to obtain an amplified filtered uplink signal. The radio frequency analog-to-digital converter is configured to convert the amplified filtered uplink signal into a first digital intermediate frequency signal. The digital intermediate frequency module is configured to process the first digital intermediate frequency signal.

In this embodiment of this application, the radio frequency unit may process the uplink signal in the downlink slot, so that a latency can be reduced.

In some embodiments, the radio frequency unit may further include a main frequency filter. The main frequency filter is configured to filter a main frequency uplink signal from the antenna in an uplink slot, to obtain a filtered main frequency uplink signal, where the main frequency uplink signal is a signal of a main frequency band. The multiplexer may be further configured to filter the uplink signal in the uplink slot, to obtain the filtered uplink signal. The low noise amplifier is further configured to amplify the filtered uplink signal and the uplink signal, to obtain the amplified filtered uplink signal and an amplified filtered main frequency uplink signal. The radio frequency analog-to-digital converter is further configured to convert the amplified filtered uplink signal and the amplified filtered main frequency uplink signal into a second digital intermediate frequency signal. The digital intermediate frequency module is further configured to process the second digital intermediate frequency signal.

In this embodiment of this application, the radio frequency unit may further process the main frequency uplink signal and the uplink signal in the uplink slot. Therefore, an uplink rate is improved.

In some embodiments, the radio frequency unit may further include a single-pole multi-throw switch. The single-pole multi-throw switch is configured to connect a target filter in the multiplexer in the downlink slot, where the target filter is configured to filter a signal of a target frequency band in the uplink signal, to obtain a target uplink filtered signal. The low noise amplifier is further configured to amplify the target uplink filtered signal, to obtain an amplified target uplink filtered signal. The radio frequency analog-to-digital converter is further configured to convert the amplified target uplink filtered signal into a third digital intermediate frequency signal. The digital intermediate frequency module is further configured to process the third digital intermediate frequency signal.

In this embodiment of this application, the radio frequency unit may process the signal of the target frequency band in the uplink signal in the downlink slot by using the single-pole multi-throw switch, so that flexibility of this solution is improved.

In some embodiments, the low noise amplifier includes any one of a wideband low noise amplifier and an adjustable gain amplifier set, and there is a correspondence between each adjustable gain amplifier in the adjustable gain amplifier set and each filter in the N filters.

In this embodiment of this application, a form of the low noise amplifier is limited, to improve implementability of this solution.

In some embodiments, the radio frequency unit includes: a filter, a low noise amplifier, a radio frequency analog-to-digital converter, and a digital intermediate frequency module. The filter is configured to filter an uplink signal from an antenna in a downlink slot, to obtain a filtered uplink signal, where the uplink signal includes a signal of a target frequency band in N frequency bands, and N is an integer greater than 1. The low noise amplifier may be a wideband low noise amplifier, and the wideband low noise amplifier is configured to amplify the filtered uplink signal, to obtain an amplified filtered uplink signal. The radio frequency analog-to-digital converter is configured to convert the amplified filtered uplink signal into a digital intermediate frequency signal. The digital intermediate frequency module is configured to process the digital intermediate frequency signal.

In this embodiment of this application, the radio frequency unit may process the uplink signal of the target frequency band in the downlink slot, so that implementability of this solution is improved.

In some embodiments, the radio frequency unit includes: a duplexer, a low noise amplifier, a radio frequency analog-to-digital converter, and a digital intermediate frequency module. The duplexer is configured to filter an uplink signal from an antenna in a downlink slot, to obtain a filtered uplink signal, where the uplink signal includes a signal of a target frequency band in N frequency bands, and N is an integer greater than 1. The low noise amplifier may be a wideband low noise amplifier, and the wideband low noise amplifier is configured to amplify the filtered uplink signal, to obtain an amplified filtered uplink signal. The radio frequency analog-to-digital converter is configured to convert the amplified filtered uplink signal into a digital intermediate frequency signal. The digital intermediate frequency module is configured to process the digital intermediate frequency signal.

In this embodiment of this application, the radio frequency unit may process the uplink signal of the target frequency band in the downlink slot, so that implementability of this solution is improved.

In some embodiments, the radio frequency unit may be used in a frequency division duplex (FDD) system. The radio frequency unit includes: a multiplexer, a low noise amplifier, a radio frequency analog-to-digital converter, a digital intermediate frequency module, and a duplexer. The multiplexer is configured to filter an uplink signal from an antenna, to obtain a filtered uplink signal, where the uplink signal includes signals of N frequency bands, and N is an integer greater than 1. The duplexer is configured to filter a main frequency uplink signal from the antenna, to obtain a filtered main frequency uplink signal, where the main frequency uplink signal is a signal of a first main frequency band. The low noise amplifier is configured to amplify the filtered uplink signal and the filtered main frequency uplink signal, to obtain an amplified filtered uplink signal and an amplified filtered main frequency uplink signal. The radio frequency analog-to-digital converter is configured to convert the amplified filtered uplink signal and the amplified filtered main frequency uplink signal into a first digital intermediate frequency signal.

In this embodiment of this application, the radio frequency unit may process the uplink signal including the signals of the N frequency bands and the main frequency uplink signal, so that an uplink rate is improved.

In some embodiments, the digital intermediate frequency module may be further configured to convert a baseband signal into a second digital intermediate frequency signal. The radio frequency analog-to-digital converter may be further configured to convert the second digital intermediate frequency signal into a radio frequency signal. The power amplifier may be further configured to perform power amplification on the radio frequency signal, to obtain an amplified radio frequency signal. The duplexer may be further configured to filter the amplified radio frequency signal, to obtain a main frequency downlink signal, where the main frequency downlink signal is a signal of a second main frequency band.

In some embodiments, the low noise amplifier includes any one of a wideband low noise amplifier and an adjustable gain amplifier set, and there is a correspondence between each adjustable gain amplifier in the adjustable gain amplifier set and each filter in the N filters.

In some embodiments, the radio frequency unit may be used in an FDD system. The radio frequency unit includes: a multiplexer, a wideband low noise amplifier, a radio frequency analog-to-digital converter, a digital intermediate frequency module, a power amplifier, and a main frequency filter. The multiplexer is configured to filter an uplink signal from an antenna, to obtain a filtered uplink signal, where the uplink signal includes signals of N frequency bands, and N is an integer greater than 1. The low noise amplifier is configured to amplify the filtered uplink signal, to obtain an amplified filtered uplink signal. The radio frequency analog-to-digital converter is configured to convert the filtered uplink signal into a first digital intermediate frequency signal. The digital intermediate frequency module is configured to process the first digital intermediate frequency signal. The digital intermediate frequency module is further configured to convert a baseband signal into a second digital intermediate frequency signal. The radio frequency analog-to-digital converter is further configured to convert the second digital intermediate frequency signal into a radio frequency signal. The power amplifier is configured to amplify the radio frequency signal, to obtain an amplified radio frequency signal. The main frequency filter is configured to filter the amplified radio frequency signal, to obtain a main frequency downlink signal.

In this embodiment of this application, the radio frequency unit may process the uplink signal including the signals of the N frequency bands, so that an uplink rate is improved.

In some embodiments, the low noise amplifier includes any one of a wideband low noise amplifier and an adjustable gain amplifier set, and there is a correspondence between each adjustable gain amplifier in the adjustable gain amplifier set and each filter in the N filters.

In some embodiments, this application provides an antenna. The antenna includes a main frequency antenna and a multi-frequency antenna. The multi-frequency antenna is configured to receive an uplink signal in a downlink slot, where the uplink signal includes signals of N frequency bands, and N is an integer greater than 1.

The multi-frequency antenna is further configured to receive the uplink signal in an uplink slot. The main frequency antenna is configured to send a main frequency downlink signal in the downlink slot, where the main frequency downlink signal is a signal of a main frequency band.

In this embodiment of this application, the antenna may receive the uplink signal in the downlink slot, and the uplink signal includes the signals of the N frequency bands. Therefore, a latency can be reduced.

In some embodiments, the multi-frequency antenna includes N independent antenna units, the N independent antenna units correspond to N antenna ports, and there is a correspondence between the N independent antenna units and the signals in the frequency bands in the uplink signal.

In this embodiment of this application, a form of the multi-frequency antenna is limited. Therefore, implementability of this solution is improved.

In some embodiments, the multi-frequency antenna includes a first antenna and a second antenna, where the first antenna includes one antenna unit, and the second antenna includes (N-M) antenna units. The first antenna is configured to receive signals of M frequency bands in the signals of the N frequency bands, where the signals of the M frequency bands correspond to a same antenna port, or the signals of the M frequency bands correspond to M different antenna ports, and M is an integer greater than or equal to 2. The second antenna is configured to receive signals of (N-M) frequency bands in the signals of the N frequency bands, where the signals of the (N-M) frequency bands correspond to (N-M) different antenna ports.

In this embodiment of this application, a form of the multi-frequency antenna is limited. Therefore, implementability of this solution is improved.

In some embodiments, the multi-frequency antenna includes a first antenna and a second antenna. The first antenna and the main frequency antenna correspond to a same antenna unit, the first antenna is configured to receive signals of S frequency bands in the signals of the N frequency bands, the signals of the S frequency bands correspond to a same antenna port, or the signals of the S frequency bands correspond to S different antenna ports, and S is an integer greater than or equal to 1. The second antenna includes (N-S) antenna units, and the second antenna is configured to receive signals of (N-S) frequency bands in the signals of the N frequency bands, where the signals of the (N-S) frequency bands correspond to (N-S) different antenna ports.

In this embodiment of this application, a form of the multi-frequency antenna is limited. Therefore, implementability of this solution is improved.

In some embodiments, the antenna includes: a main frequency antenna and a multi-frequency antenna. The multi-frequency antenna is configured to receive an uplink signal in a downlink slot, where the uplink signal includes a signal of a target frequency band in N frequency bands, and N is an integer greater than 1. The main frequency antenna is configured to receive a main frequency uplink signal in an uplink slot, where the main frequency uplink signal is a signal of a main frequency band. The main frequency antenna and the multi-frequency antenna correspond to a same antenna unit, or the main frequency antenna and the multi-frequency antenna correspond to different antenna units.

In this embodiment of this application, the antenna may receive the uplink signal in the downlink slot, so that a latency is reduced.

In some embodiments, the antenna includes a main frequency antenna and a multi-frequency antenna. The multi-frequency antenna is configured to receive an uplink signal, where the uplink signal includes signals of N frequency bands, and N is an integer greater than 1. The main frequency antenna is configured to receive a main frequency uplink signal, where the main frequency uplink signal is a signal of a first main frequency band. The main frequency antenna is further configured to send a main frequency downlink signal, where the main frequency downlink signal is a signal of a second main frequency band.

In this embodiment of this application, the antenna may receive the uplink signal in the first main frequency band and the N frequency bands, and send the downlink signal in the second main frequency band. Therefore, an uplink rate and uplink coverage can be improved.

In some embodiments, the antenna includes a main frequency antenna and a multi-frequency antenna. The multi-frequency antenna is configured to receive an uplink signal, where the uplink signal includes signals of N frequency bands, and N is an integer greater than 1. The main frequency antenna is configured to send a main frequency downlink signal, where the main frequency downlink signal is a signal of a main frequency band.

In this embodiment of this application, the antenna may receive the uplink signal in the N frequency bands, so that an uplink rate is improved.

In some embodiments, this application provides a signal processing method. An uplink signal from an antenna may be filtered in a downlink slot, to obtain a filtered uplink signal, where the uplink signal includes signals of N frequency bands, and N is an integer greater than 1. After the filtered uplink signal is obtained, the filtered uplink signal may be amplified, to obtain an amplified filtered uplink signal. Then, the amplified filtered uplink signal may be converted into a first digital intermediate frequency signal. Finally, the first digital intermediate frequency signal is processed.

In this embodiment of this application, the uplink signal in the N frequency bands may be processed in the downlink slot. Therefore, a latency can be reduced.

In some embodiments, a main frequency uplink signal and the uplink signal that are from the antenna may be further filtered in the uplink slot, to obtain a filtered main frequency uplink signal and the filtered uplink signal, where the main frequency uplink signal is a signal of a main frequency band. Next, the filtered uplink signal and the filtered main frequency uplink signal are amplified, to obtain the amplified filtered uplink signal and an amplified filtered main frequency uplink signal. Then, the amplified filtered uplink signal and the amplified filtered main frequency uplink signal are converted into a second digital intermediate frequency signal. Finally, the second digital intermediate frequency signal is processed.

In this embodiment of this application, the main frequency uplink signal and the uplink signal in the N frequency bands may be further processed in the uplink slot. Therefore, an uplink rate is further improved.

In some embodiments, the filtering an uplink signal from an antenna in a downlink slot may include: filtering a signal of a target frequency band in the uplink signal from the antenna in the downlink slot, to obtain a target uplink filtered signal; and next amplifying the target uplink filtered signal, to obtain an amplified target uplink filtered signal; then converting the amplified target uplink filtered signal into a third digital intermediate frequency signal; and finally processing the third digital intermediate frequency signal.

In this embodiment of this application, only the signal of the target frequency band in the uplink signal is processed in the downlink slot, so that flexibility of this solution is improved.

In some embodiments, the method may be applied to a radio frequency unit.

In some embodiments, this application provides a signal processing method, including: filtering an uplink signal from an antenna in a downlink slot, to obtain a filtered uplink signal, where the uplink signal includes a signal of a target frequency band in N frequency bands, and N is an integer greater than 1; after the filtered uplink signal is obtained, amplifying the filtered uplink signal, to obtain an amplified filtered uplink signal; then converting the amplified filtered uplink signal into a digital intermediate frequency signal; and finally processing the digital intermediate frequency signal.

In this embodiment of this application, the uplink signal may be processed in the downlink slot, and the uplink signal is the signal of the target frequency band in the N frequency bands. Therefore, flexibility of this solution is improved.

In some embodiments, this application provides a signal processing method. The method may be applied to an FDD system. An uplink signal and a main frequency uplink signal that are from an antenna may be filtered, to obtain a filtered uplink signal and a filtered main frequency uplink signal, where the uplink signal includes signals of N frequency bands, N is an integer greater than 1, and the main frequency uplink signal is a signal of a first main frequency band. Next, the filtered uplink signal and the filtered main frequency uplink signal are amplified, to obtain an amplified filtered uplink signal and an amplified filtered main frequency uplink signal. Then, the amplified filtered uplink signal and the amplified main frequency uplink signal are converted into a first digital intermediate frequency signal. Finally, the first digital intermediate frequency signal is processed.

In this embodiment of this application, the uplink signal in N frequency bands and the main frequency uplink signal may be processed, so that an uplink rate and uplink coverage are improved.

In some embodiments, a baseband signal may be further converted into a second digital intermediate frequency signal. Next, the second digital intermediate frequency signal is converted into a radio frequency signal. Then, the radio frequency signal is amplified, to obtain an amplified radio frequency signal. Finally, the amplified radio frequency signal is filtered, to obtain a main frequency downlink signal, where the main frequency downlink signal is a signal of a second main frequency band.

In this embodiment of this application, the main frequency downlink signal whose frequency band is the second main frequency band may be further sent while the uplink signal and the main frequency uplink signal are processed, so that integrity of this solution is improved.

In some embodiments, this application provides a signal processing method. The signal processing method may be applied to an FDD system. An uplink signal from an antenna may be filtered, to obtain a filtered uplink signal, where the uplink signal includes signals of N frequency bands, and N is an integer greater than 1. Then, the filtered uplink signal is amplified, to obtain an amplified filtered uplink signal. Finally, the filtered uplink signal is converted into a first digital intermediate frequency signal, and the first digital intermediate frequency signal is processed.

In this embodiment of this application, the uplink signal in the N frequency bands may be processed, so that an uplink rate is improved.

In some embodiments, a baseband signal may be further converted into a second digital intermediate frequency signal. Next, the second digital intermediate frequency signal is converted into a radio frequency signal. Then, the radio frequency signal is amplified, to obtain an amplified radio frequency signal. Finally, the amplified radio frequency signal is filtered, to obtain a main frequency downlink signal.

In some embodiments, this application provides a signal processing method, including: receiving an uplink signal in a downlink slot, where the uplink signal includes signals of N frequency bands, and N is an integer greater than 1; and receiving an uplink signal in the uplink slot, and sending a main frequency downlink signal in the downlink slot, where the main frequency downlink signal is a signal of a main frequency band.

In this embodiment of this application, the uplink signal in the N frequency bands may be received in the downlink slot. Therefore, a latency can be reduced.

In some embodiments, this application provides a signal processing method, including: receiving an uplink signal in a downlink slot, where the uplink signal includes a signal of a target frequency band in N frequency bands, and N is an integer greater than 1; and receiving a main frequency uplink signal in an uplink slot, where the main frequency uplink signal is a signal of a main frequency band.

In this embodiment of this application, the uplink signal may be received in the downlink slot, and the uplink signal is the signal of the target frequency band in the N frequency bands. Therefore, a latency can be reduced, and flexibility of this solution is improved.

In some embodiments, this application provides a signal processing method, including: receiving an uplink signal and a main frequency uplink signal, where the uplink signal includes signals of N frequency bands, N is an integer greater than 1, and the main frequency uplink signal is a signal of a first main frequency band; and sending the main frequency downlink signal, where the main frequency downlink signal is a signal of a second main frequency band.

In this embodiment of this application, the uplink signal including the signals of the N frequency bands and the main frequency uplink signal may be received, so that an uplink rate and uplink coverage are improved.

In some embodiments, this application provides a signal processing method, including: receiving an uplink signal, where the uplink signal includes signals of N frequency bands, and N is an integer greater than 1; and sending a main frequency downlink signal, where the main frequency downlink signal is a signal of a main frequency band.

In this embodiment of this application, the uplink signal including the signals of the N frequency bands may be received, so that an uplink rate is improved.

In some embodiments, this application provides a communication system. The communication system includes the radio frequency unit and/or the antenna as discussed herein.

BRIEF DESCRIPTION OF DRAWINGS

FIG. 1a is a schematic diagram of a structure of an active antenna unit and a baseband processing unit;

FIG. 1b is a schematic diagram of a structure of a baseband processing unit, a remote radio unit, and an antenna;

FIG. 2 is a schematic diagram of an uplink-downlink slot ratio;

DESCRIPTION OF EMBODIMENTS

Embodiments of this application provide a radio frequency unit, an antenna, and a signal processing method, so that an uplink signal may be received in a downlink slot of a system, to improve utilization of resources for receiving uplink signals in a TDD architecture, and reduce a latency.

In the specification, claims, and accompanying drawings of this application, the terms "first", "second", "third", "fourth", and so on (if existent) are intended to distinguish between similar objects but do not necessarily indicate an order or sequence. It should be understood that the data termed in such a way are interchangeable in proper circumstances so that embodiments of this application described herein can be implemented in orders except the order illustrated or described herein. In addition, the terms "include", "have" and any other variants thereof are intended to cover non-exclusive inclusion. For example, a process, method, system, product, or device that includes a list of operations or units is not necessarily limited to those operations or units that are expressly listed, but may include other operations or units that are not expressly listed or inherent to the process, method, product, or device.

Refer to FIG. 1a. In embodiments of this application, a radio frequency unit may be an active antenna unit (AAU), and further includes an antenna part. The AAU is connected to a baseband processing unit.

Refer to FIG. 1B. In embodiments of this application, a radio frequency unit may alternatively be a remote radio unit (RRU). The RRU may be combined with an antenna provided in embodiments of this application, and is connected to a baseband processing unit.

In a TDD standard, transmission of an uplink signal and a downlink signal is implemented in a same frequency band in a time division mode. In some embodiments, user equipment sends a signal to a base station in an uplink slot of a system, and the base station sends a signal to the user equipment in a downlink slot of the system. Refer to FIG. 2. "D" represents a downlink subframe, "S" represents a special subframe, and "U" represents an uplink subframe. In the TDD standard, different carriers usually have fixed uplink-downlink slot ratios. For example, an uplink-downlink slot ratio of a carrier A is 2:8, and an uplink-downlink slot ratio of a carrier B is 3:7. A bandwidth of 100 MHz is used as an example. If an uplink-downlink slot ratio is 2:8, an equivalent uplink bandwidth is only 20 MHz. Therefore, an uplink rate is limited.

Figure 3:
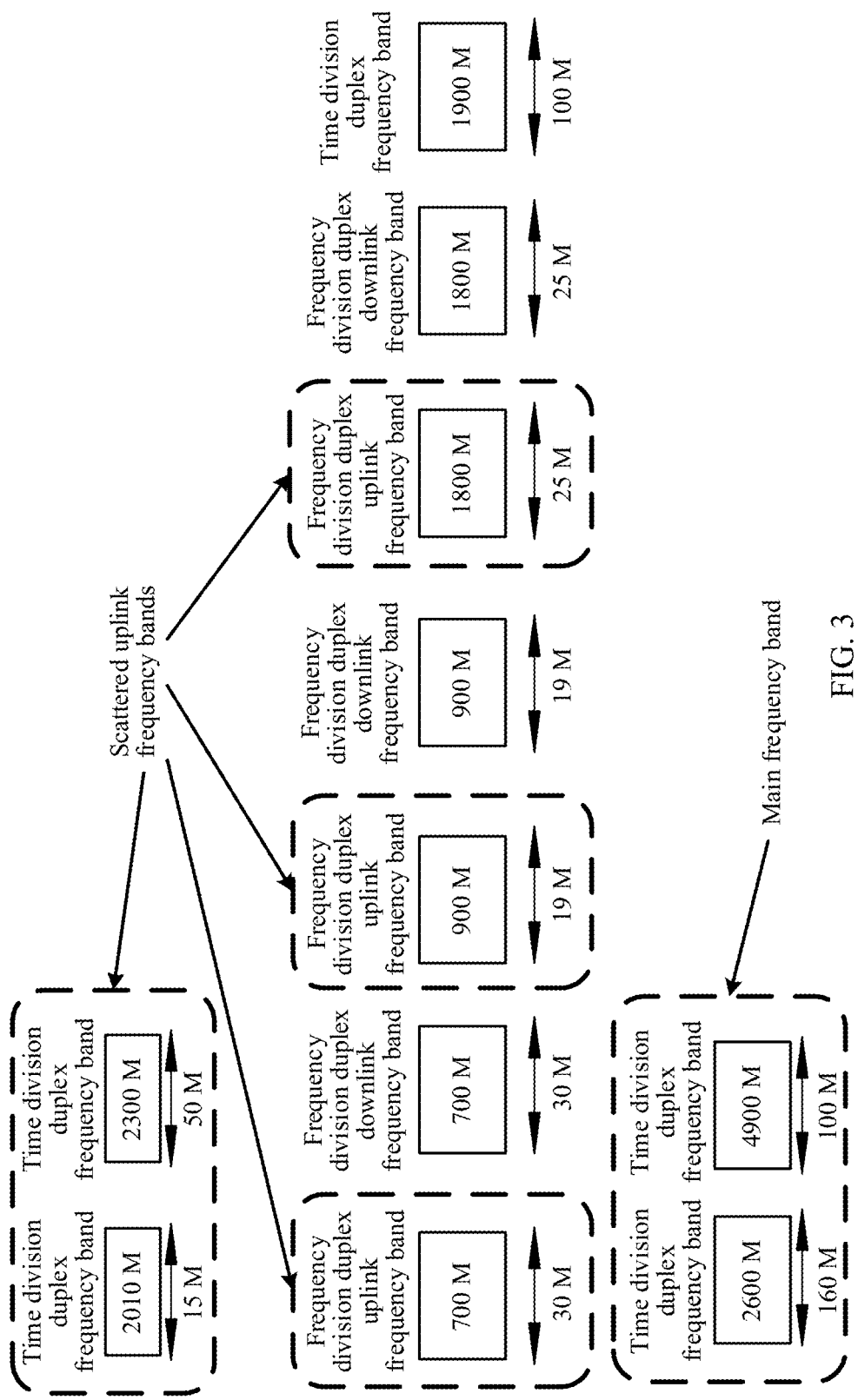
FIG. 3 is a schematic diagram of distribution of communication frequency bands.

Each carrier usually has a plurality of frequency bands, which are separately used in the TDD standard and an FDD standard. Refer to FIG. 3. Frequency bands of a carrier include an uplink frequency band in the FDD standard, a downlink frequency band in the FDD standard, and an uplink frequency band and a downlink frequency band in the TDD standard, where there are both a main frequency band with a continuous large bandwidth and scattered frequency bands with narrow bandwidths. In embodiments of this application, one or more frequency bands among the scattered uplink frequency bands may be flexibly selected depending on different uplink rate requirements, uplink coverage requirements, and spectrum interference requirements to receive an uplink signal, and an uplink resource in a digital intermediate frequency module is flexibly allocated to each scattered uplink frequency band. In an uplink slot, a system receives an uplink signal in the main frequency band and the scattered frequency bands, or receives an uplink signal in any one of the main frequency band and the scattered frequency bands. In a downlink slot, the system sends a downlink signal in the main frequency band, and receives an uplink signal in the scattered frequency bands.

Figure 4:
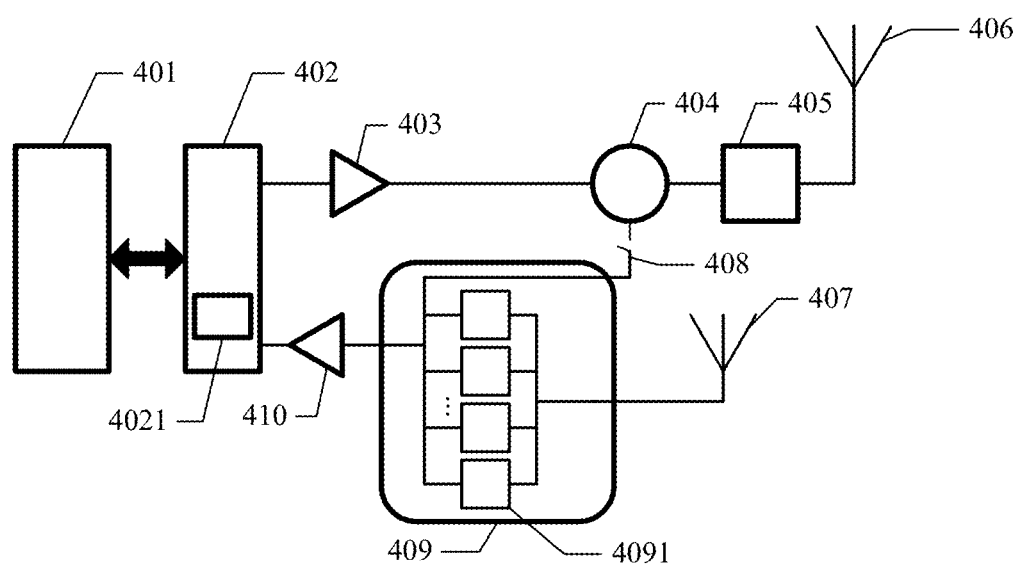
FIG. 4 is a schematic diagram of a communication system according to an embodiment of this application.

Refer to FIG. 4. An RRU and an antenna in an embodiment of this application may be used in a communication system.

The communication system includes: a digital intermediate frequency module 401, a radio frequency integrated chip 402, a power amplifier 403, a circulator 404, a main frequency filter 405, a main frequency antenna 406, a switch 408, a multi-frequency antenna 407, a multiplexer 409, and a wideband low noise amplifier 410, where the radio frequency integrated chip 402 further includes a radio frequency analog-to-digital converter 4021.

It should be noted that, in the communication system, the RRU provided in this embodiment of this application includes: the digital intermediate frequency module 401, the radio frequency integrated chip 402, the power amplifier 403, the circulator 404, the main frequency filter 405, the switch 408, the multiplexer 409, and the wideband low noise amplifier 410. The antenna provided in this embodiment of this application includes the main frequency antenna 406 and the multi-frequency antenna 407. It should be noted that the foregoing classification is merely an example. In actual application, there may alternatively be another classification manner. For example, some modules may be classified as antennas. This is not limited in this application.

The communication system is described below.

A downlink slot is used as an example.

The digital intermediate frequency module 401 is configured to: convert a baseband signal sent by a base station into a digital intermediate frequency signal, and send the digital intermediate frequency signal to the radio frequency integrated chip 402, where a frequency of the baseband signal is a frequency of a main frequency band.

The radio frequency analog-to-digital converter 4021 in the radio frequency integrated chip 402 is configured to: convert the digital intermediate frequency signal into a radio frequency signal, and send the radio frequency signal to the power amplifier 403.

The power amplifier 403 is configured to perform power amplification on the radio frequency signal, and send the radio frequency signal to the circulator 404.

The circulator 404 is configured to transmit the radio frequency signal to the main frequency filter 405.

The main frequency filter 405 is configured to: filter the radio frequency signal, and send the radio frequency signal to the main frequency antenna 406.

The main frequency antenna 406 is configured to transmit the radio frequency signal to free space, and the radio frequency signal is transmitted to user equipment through the free space. It should be noted that the radio frequency signal is a main frequency downlink signal.

The multi-frequency antenna 407 is configured to: receive an uplink signal sent by the user equipment, where the uplink signal includes signals of N frequency bands, and send the uplink signal to the multiplexer 409, where the multi-frequency antenna may be a wideband antenna, and the N frequency bands are scattered frequency bands.

N corresponding filters 4091 in the multiplexer 409 are configured to filter the signals of the N frequency bands in the uplink signal, to obtain a filtered uplink signal, and send the filtered uplink signal to the wideband low noise amplifier, where the signals of the N frequency bands in the uplink signal correspond to a same antenna port.

The wideband low noise amplifier 410 is configured to: amplify the filtered uplink signal, to obtain an amplified filtered uplink signal, and send the amplified filtered uplink signal to the radio frequency integrated chip 4021.

The radio frequency analog-to-digital converter 4021 in the radio frequency integrated chip 402 is further configured to: convert the amplified filtered uplink signal into a first digital intermediate frequency signal, and send the first digital intermediate frequency signal to the digital intermediate frequency module 401.

The digital intermediate frequency module 401 is further configured to process the first digital intermediate frequency signal.

It should be noted that, in the downlink slot, the switch 408 is in an off state.

An uplink slot is used as an example.

It should be noted that, in the uplink slot, the switch 408 is in an on state, and connects the circulator 404, the main frequency filter 405, and the multiplexer 409.

The main frequency antenna 406 is further configured to: receive a main frequency uplink signal sent by the user equipment, and send the main frequency uplink signal to the main frequency filter 405, where a frequency of the main frequency uplink signal is a frequency of a main frequency band.

The main frequency filter 405 is further configured to: filter the main frequency uplink signal, to obtain a filtered main frequency uplink signal, and send the filtered main frequency uplink signal to the circulator 404.

The circulator 404 is configured to transmit the filtered main frequency uplink signal to the multiplexer.

The multi-frequency antenna 407 is configured to: receive an uplink signal sent by the user equipment, where the uplink signal includes signals of N frequency bands, and send the uplink signal to the multiplexer 409, where the multi-frequency antenna 407 may be a wideband antenna, and the N frequency bands are scattered frequency bands.

The multiplexer 409 is configured to filter the signals of the N frequency bands in the uplink signal by using N corresponding filters respectively, to obtain a filtered uplink signal, and send the filtered uplink signal and the filtered main frequency uplink signal to the wideband low noise amplifier.

The wideband low noise amplifier 410 is further configured to: amplify the filtered uplink signal and the filtered main frequency uplink signal, and send amplified signals to the radio frequency integrated chip 402.

The radio frequency analog-to-digital converter 4021 in the radio frequency integrated chip 402 is further configured to: convert the amplified uplink signal in the N frequency bands and the amplified main frequency uplink signal into a second digital intermediate frequency signal, and send the second digital intermediate frequency signal to the digital intermediate frequency module 401.

The digital intermediate frequency module 401 is further configured to process the second digital intermediate frequency signal.

In this embodiment of this application, in a downlink slot, an uplink signal may be received through the multi-frequency antenna 407, and in an uplink slot, a main frequency uplink signal and an uplink signal are received, or only a main frequency uplink signal may be received in an uplink slot. In this way, an idle receiving resource in the downlink slot is fully utilized, an uplink rate is improved, and a latency is reduced. In addition, because scattered frequency bands include a low frequency band and a medium frequency band, for example, a low frequency band of 700 MHz or 900 MHz, and signal transmission using a low frequency band has characteristics of a low path loss and a strong propagation capability, an uplink coverage problem in a conventional technology can be resolved.

Figure 5:
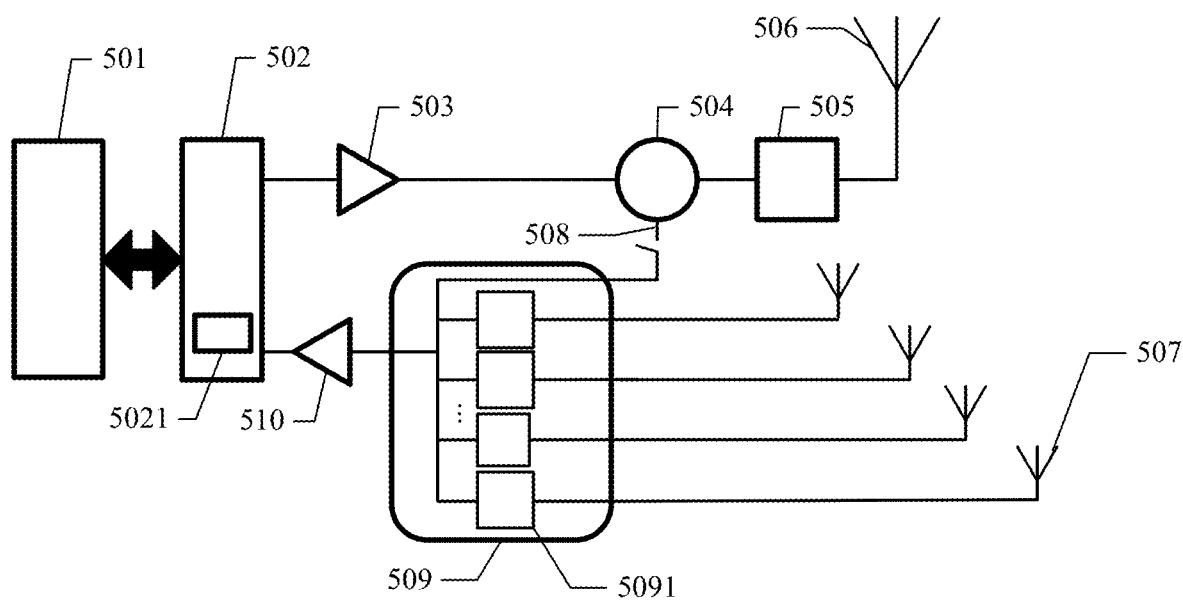
FIG. 5 is another schematic diagram of a communication system according to an embodiment of this application.

Refer to FIG. 5. Based on FIG. 4, an RRU and an antenna provided in an embodiment of this application may alternatively be used in another communication system. In the communication system, a multi-frequency antenna in the antenna may include N independent antenna units, each of the antenna units corresponding to one antenna port.

The communication system is described below.

In an uplink slot and a downlink slot, the N independent antenna units 507 are separately configured to receive an uplink signal sent by user equipment, where the uplink signal includes signals of N frequency bands, and there is a correspondence between the N independent antenna units and the signals of the N frequency bands in the uplink signal.

A remaining part of the communication system is similar to that described in FIG. 4, and details are not described herein again.

Figure 6:
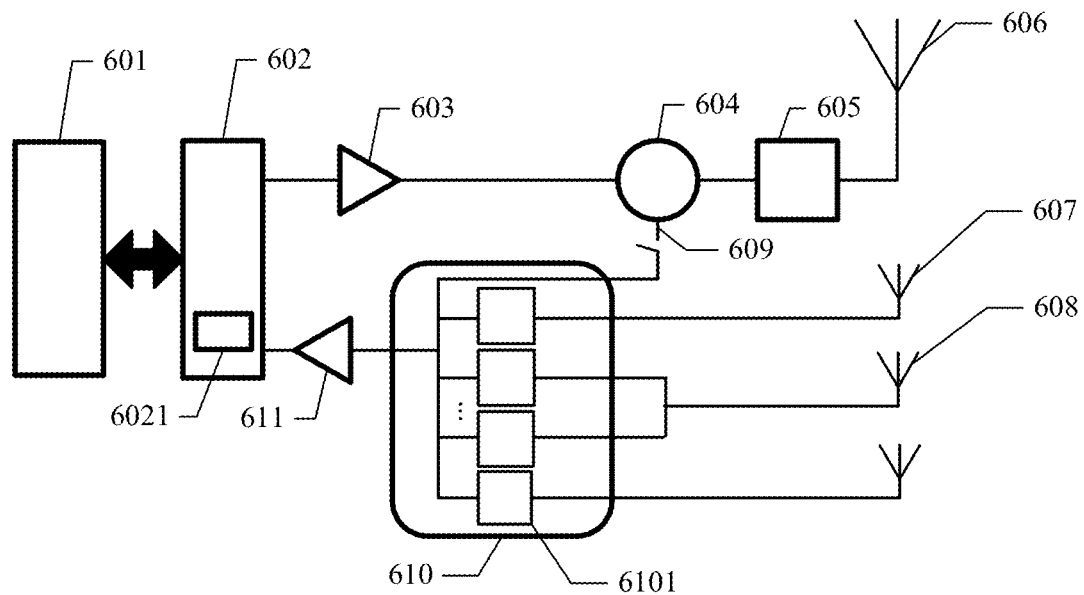
FIG. 6 is another schematic diagram of a communication system according to an embodiment of this application.

Refer to FIG. 6. Based on FIG. 4, an RRU and an antenna provided in an embodiment of this application may alternatively be used in another communication system. In the communication system, a multi-frequency antenna may include a first antenna 608 and a second antenna 607. The first antenna 608 includes an independent antenna unit, and the first antenna 608 is configured to receive signals of M frequency bands in N frequency bands, where the N frequency bands are scattered frequency bands. The second antenna 607 includes (N-M) antenna units, where M is an integer greater than or equal to 2, the (N-M) antenna units are configured to receive signals of (N-M) frequency bands in the N frequency bands, and there is a correspondence between the (N-M) antenna units and the signals of the (N-M) frequency bands. It should be noted that signals that are of the M frequency bands and that are received by the first antenna 608 may correspond to M different antenna ports, and in this case, the first antenna 608 may be a multi-frequency resonance antenna unit. Alternatively, the signals of the M frequency bands may correspond to only one antenna port, and in this case, the first antenna 608 may be a wideband antenna unit.

The communication system is described below.

In an uplink slot and a downlink slot, the first antenna 608 receives uplink signals that are of the M frequency bands in the N frequency bands and that are sent by user equipment, and sends the signals of the M frequency bands to the multiplexer 610.

The second antenna 607 is configured to: receive the signals that are of (N-M) frequency bands that are sent by the user equipment, and send the signals of the (N-M) frequency bands to the multiplexer 610.

A remaining part of the communication system is similar to that described in FIG. 4, and details are not described herein again.

Figure 7:
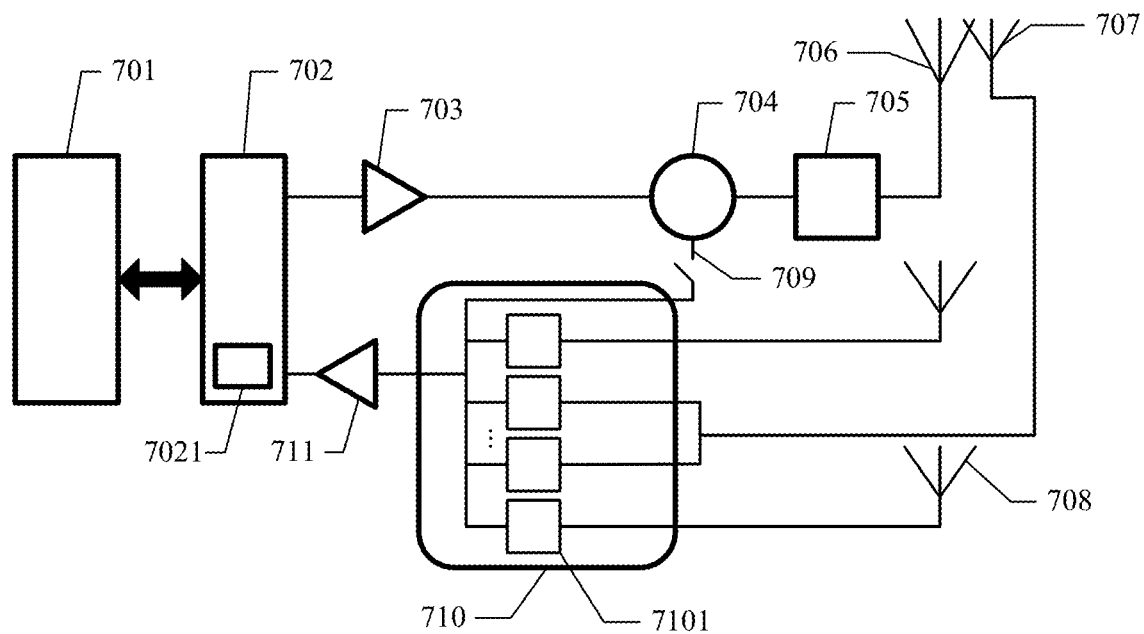
FIG. 7 is another schematic diagram of a communication system according to an embodiment of this application.

Refer to FIG. 7. Based on FIG. 4, an RRU and an antenna provided in an embodiment of this application may be used in another communication system. In the communication system, a multi-frequency antenna may include a first antenna 707 and a second antenna 708. The first antenna 707 includes an antenna unit, the first antenna 707 and a main frequency antenna 706 share an antenna unit, and the first antenna 707 is configured to receive signals of S frequency bands in N frequency bands, where the N frequency bands are scattered frequency bands. The second antenna 708 includes (N-S) antenna units, where S is an integer greater than or equal to 1, the (N-S) antenna units are configured to receive signals of (N-S) frequency bands in the N frequency bands, and there is a correspondence between the (N-S) antenna units and the signals of the (N-S) frequency bands. It should be noted that signals that are of the S frequency bands and that are received by the first antenna 707 may correspond to S different antenna ports, and in this case, the first antenna 707 may be a multi-frequency resonance antenna unit. Alternatively, the signals of the S frequency bands may correspond to only one antenna port, and in this case, the first antenna 707 may be a wideband antenna unit.

An architecture of the communication system is described below.

In an uplink slot and a downlink slot, the first antenna 707 receives uplink signals that are of the S frequency bands in the N frequency bands and that are sent by user equipment, and sends the signals of the S frequency bands to the multiplexer 710.

The second antenna 708 is configured to: receive the signals that are of (N-S) frequency bands that are sent by the user equipment, and send the signals of the (N-S) frequency bands to the multiplexer 710.

A remaining part is similar to that described in FIG. 4, and details are not described herein again.

Figure 8:
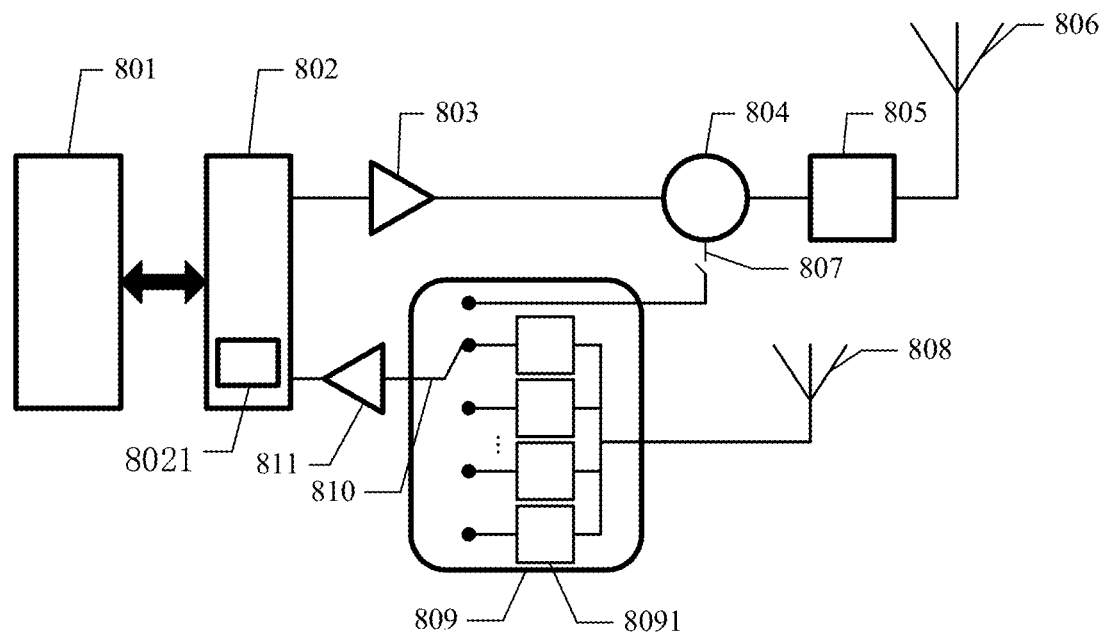
FIG. 8 is another schematic diagram of a communication system according to an embodiment of this application.

Refer to FIG. 8. Based on FIG. 4, an RRU and an antenna provided in an embodiment of this application may alternatively be used in another communication system. In the communication system, the RRU further includes a single-pole multi-throw switch 810, and a wideband low noise amplifier 811 may be connected to any filter 8091 in a multiplexer 809 through the single-pole multi-throw switch 810.

The following describes the communication system by using a downlink slot as an example.

The multi-frequency antenna 808 is configured to: receive an uplink signal sent by user equipment, and send the uplink signal to the multiplexer 809, where the uplink signal may be a signal of a target frequency band in N frequency bands, the multi-frequency antenna 808 may be a wideband antenna, and the N frequency bands are scattered frequency bands.

The multiplexer 809 is configured to: filter the uplink signal by using a filter 8091 corresponding to the target frequency band, to obtain a target uplink filtered signal, and send the target uplink filtered signal to the wideband low noise amplifier 811.

The single-pole multi-throw switch 810 is configured to connect the filter 8091 and the wideband low noise amplifier 811.

The wideband low noise amplifier 811 is configured to: amplify the target uplink filtered signal, to obtain an amplified target uplink filtered signal, and send the amplified target uplink filtered signal to the radio frequency integrated chip 802.

The radio frequency integrated chip 802 is configured to: convert the amplified target uplink filtered signal into a third digital intermediate frequency signal by using a radio frequency analog-to-digital converter 8021, and send the third digital intermediate frequency signal to a digital intermediate frequency module 801.

The digital intermediate frequency module 801 is configured to process the third digital intermediate frequency signal.

A remaining part is similar to that described in FIG. 4, and details are not described herein again.

The following describes the communication system by using an uplink slot as an example.

Figure 9:
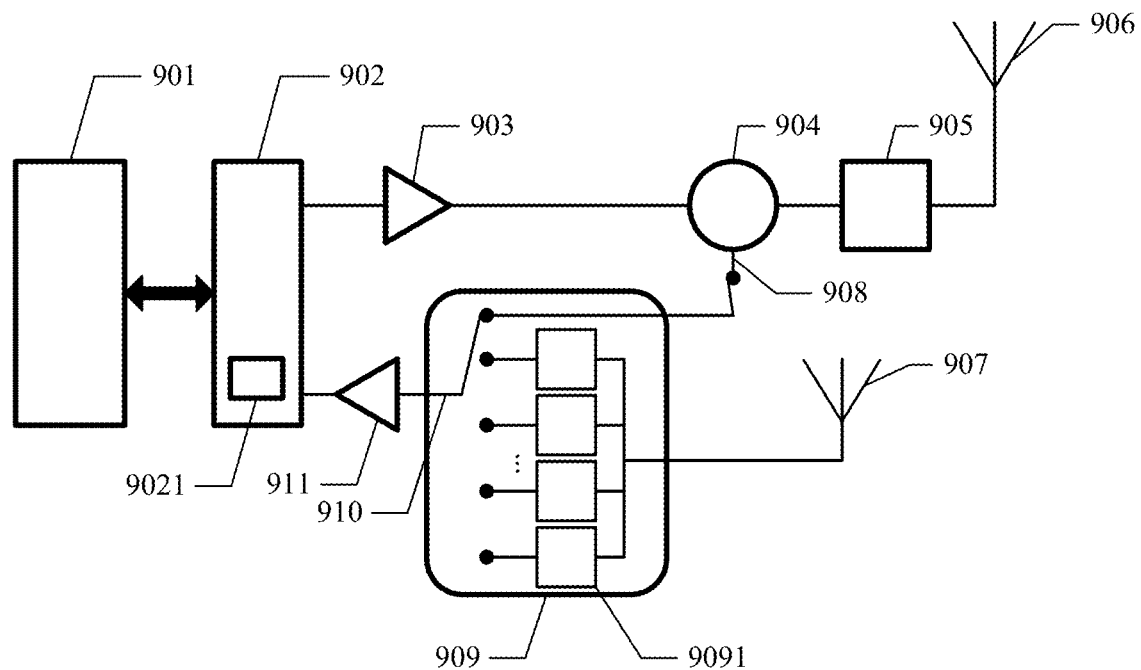
FIG. 9 is another schematic diagram of a communication system according to an embodiment of this application.

Refer to FIG. 9. A single-pole multi-throw switch 910 is configured to connect a circulator 904, a main frequency filter 905, and a wideband low noise amplifier 911.

A main frequency antenna 906 is configured to: receive a main frequency uplink signal sent by user equipment, and send the main frequency uplink signal to the main frequency filter 905, where the main frequency uplink signal is a signal of a main frequency band.

The main frequency filter 905 is configured to: filter the main frequency uplink signal, to obtain a filtered main frequency uplink signal, and send the filtered main frequency uplink signal to the circulator 904.

The circulator 904 is configured to send the filtered uplink signal to the wideband low noise amplifier 911 via the single-pole multi-throw switch 910.

The wideband low noise amplifier 911 is configured to: amplify the filtered main frequency uplink signal, to obtain an amplified filtered main frequency uplink signal, and send the amplified filtered main frequency uplink signal to a radio frequency integrated chip 902.

The radio frequency integrated chip 902 is configured to: convert the filtered main frequency uplink signal into a digital intermediate frequency signal by using a radio frequency analog-to-digital converter 9021, and send the digital intermediate frequency signal to a digital intermediate frequency module 901.

The digital intermediate frequency module 901 is configured to process the digital intermediate frequency signal.

Figure 10:
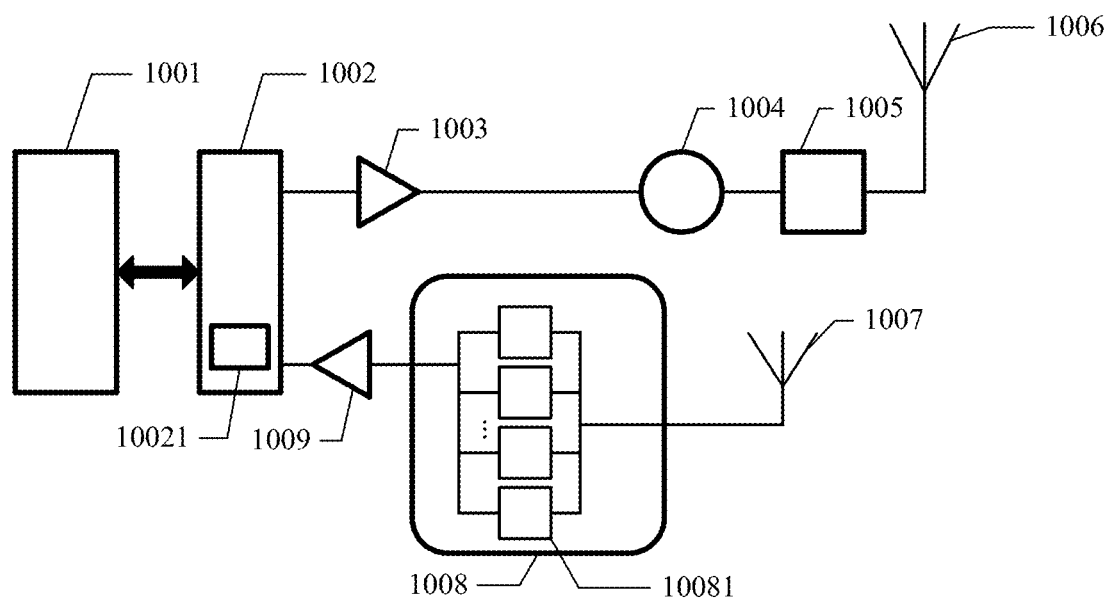
FIG. 10 is another schematic diagram of a communication system according to an embodiment of this application.

Refer to FIG. 10. Based on FIG. 4, an RRU and an antenna provided in an embodiment of this application may alternatively be used in another communication system. In the communication system, a switch and a receive channel that is in a multiplexer and that is for receiving a main frequency uplink signal are removed from the RRU. The communication system is an FDD architecture.

The communication system is described below.

A digital intermediate frequency module 1001 is configured to: convert a baseband signal sent by a base station into a digital intermediate frequency signal, and send the digital intermediate frequency signal to a radio frequency integrated chip 1002, where a frequency of the baseband signal is a frequency of a main frequency band.

A radio frequency analog-to-digital converter 10021 in the radio frequency integrated chip 1002 is configured to: convert the digital intermediate frequency signal into a radio frequency signal, and send the radio frequency signal to a power amplifier 1003.

The power amplifier 1003 is configured to perform power amplification on the radio frequency signal, and send the radio frequency signal to a circulator 1004.

The circulator 1004 is configured to transmit the radio frequency signal to a main frequency filter 1005.

The main frequency filter 1005 is configured to: filter the radio frequency signal, and send the radio frequency signal to a main frequency antenna 1006.

The main frequency antenna 1006 is configured to transmit the radio frequency signal to free space, and the radio frequency signal is transmitted to user equipment through the free space. It should be noted that the radio frequency signal is a main frequency downlink signal.

A multi-frequency antenna 1007 is configured to: receive an uplink signal sent by the user equipment, where the uplink signal includes signals of N frequency bands, and send the uplink signal to a multiplexer 1009, where the multi-frequency antenna 1007 may be a wideband antenna, and the N frequency bands are scattered frequency bands.

The multiplexer 1009 is configured to: respectively filter the signals of the N frequency bands in the uplink signal by using N corresponding filters 10091, to obtain filtered uplink signals, and send the filtered uplink signals to a wideband low noise amplifier 1010, where the signals of the N frequency bands in the uplink signal correspond to a same antenna port.

The wideband low noise amplifier 1011 is configured to: amplify the filtered uplink signals, to obtain filtered uplink signals, and send the filtered uplink signals to the radio frequency integrated chip 1002.

The radio frequency analog-to-digital converter 10021 in the radio frequency integrated chip 1002 is further configured to: convert the amplified filtered uplink signals into a digital intermediate frequency signal, and send the digital intermediate frequency signal to the digital intermediate frequency module 1001.

The digital intermediate frequency module 1001 is further configured to process the digital intermediate frequency signal.

In this embodiment of this application, a main frequency downlink signal is sent to the user equipment through the main frequency antenna, and an uplink signal sent by the user equipment is received on a plurality of frequency bands through the multi-frequency antenna. Therefore, downlink performance is improved.

Figure 11:
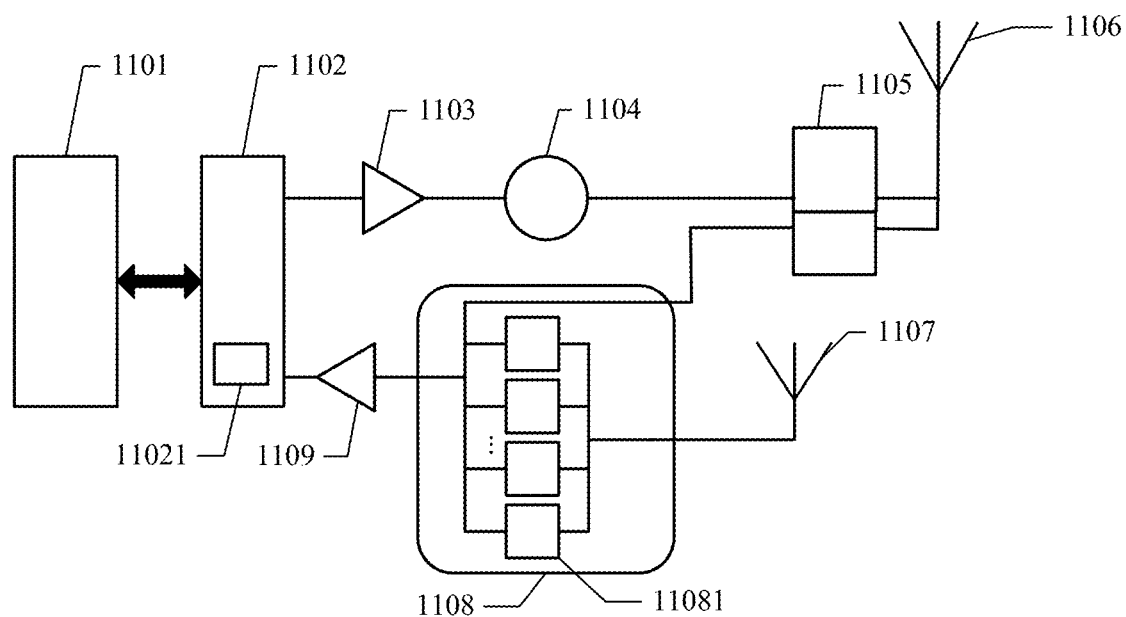
FIG. 11 is another schematic diagram of a communication system according to an embodiment of this application.

Refer to FIG. 11. Based on FIG. 4, an RRU and an antenna in an embodiment of this application may be used in another communication system. In the communication system, a switch is removed, and a main frequency filter is replaced with a duplexer 1005.

The communication system is described below.

A digital intermediate frequency module 1101 is configured to: convert a baseband signal sent by a base station into a digital intermediate frequency signal, and send the digital intermediate frequency signal to a radio frequency integrated chip 1102, where a frequency of the baseband signal is a frequency of a main frequency band.

A radio frequency analog-to-digital converter 11021 in the radio frequency integrated chip 1102 is configured to: convert the digital intermediate frequency signal into a radio frequency signal, and send the radio frequency signal to a power amplifier 1103.

The power amplifier 1103 is configured to perform power amplification on the radio frequency signal, and send the radio frequency signal to a circulator 1104.

The circulator 1104 is configured to transmit the radio frequency signal to the duplexer 1105.

The duplexer 1105 is configured to: filter the radio frequency signal, and send the radio frequency signal to a main frequency antenna 1106.

The main frequency antenna 1106 is configured to transmit the radio frequency signal to free space, where the radio frequency signal is transmitted to user equipment through the free space.

It should be noted that, a frequency of the radio frequency signal is a frequency of any frequency band in the downlink frequency band of the FDD standard shown in FIG. 3, namely, a frequency of a first main frequency band, and the radio frequency signal is a main frequency downlink signal.

The main frequency antenna 1106 is further configured to: receive a main frequency uplink signal sent by the user equipment, and send the main frequency uplink signal to the duplexer 1105. It should be noted that a frequency of the main frequency uplink signal is a frequency of any frequency band in the uplink frequency band of the FDD standard shown in FIG. 3, namely, a frequency of a second main frequency band.

The duplexer 1105 is further configured to: filter the main frequency uplink signal, to obtain a filtered main frequency uplink signal, and send the filtered main frequency uplink signal to a multiplexer 1108.

A multi-frequency antenna 1107 is configured to: receive an uplink signal sent by the user equipment, where the uplink signal includes signals of N frequency bands, and send the uplink signal to the multiplexer 1108. The multi-frequency antenna 1107 may be a wideband antenna, and the N frequency bands are scattered frequency bands.

The multiplexer 1108 is configured to: respectively filter the signals of the N different frequency bands in the uplink signal by using N corresponding filters 11081, to obtain filtered uplink signals, and send the filtered uplink signals and the filtered main frequency uplink signal to a wideband low noise amplifier 1109, where the signals of the N different frequency bands in the uplink signal correspond to one antenna port.

The wideband low noise amplifier 1109 is further configured to: amplify the filtered uplink signals and the filtered main frequency uplink signal, to obtain amplified filtered uplink signals and an amplified filtered main frequency uplink signal, and send the amplified filtered uplink signals and the amplified filtered main frequency uplink signal to the radio frequency integrated chip 1102.

The radio frequency analog-to-digital converter 11021 in the radio frequency integrated chip 1102 is further configured to: convert the amplified filtered uplink signals and the amplified main frequency uplink signal into a digital intermediate frequency signal, and send the digital intermediate frequency signal to the digital intermediate frequency module 1101.

The digital intermediate frequency module 1101 is further configured to process the digital intermediate frequency signal.

In this embodiment of this application, the main frequency antenna 1106 may send a downlink signal and receive an uplink signal over two different frequency bands, respectively. The multi-frequency antenna 1107 may receive an uplink signal over a scattered frequency band. Therefore, an uplink rate and uplink coverage can be improved.

Figure 12:
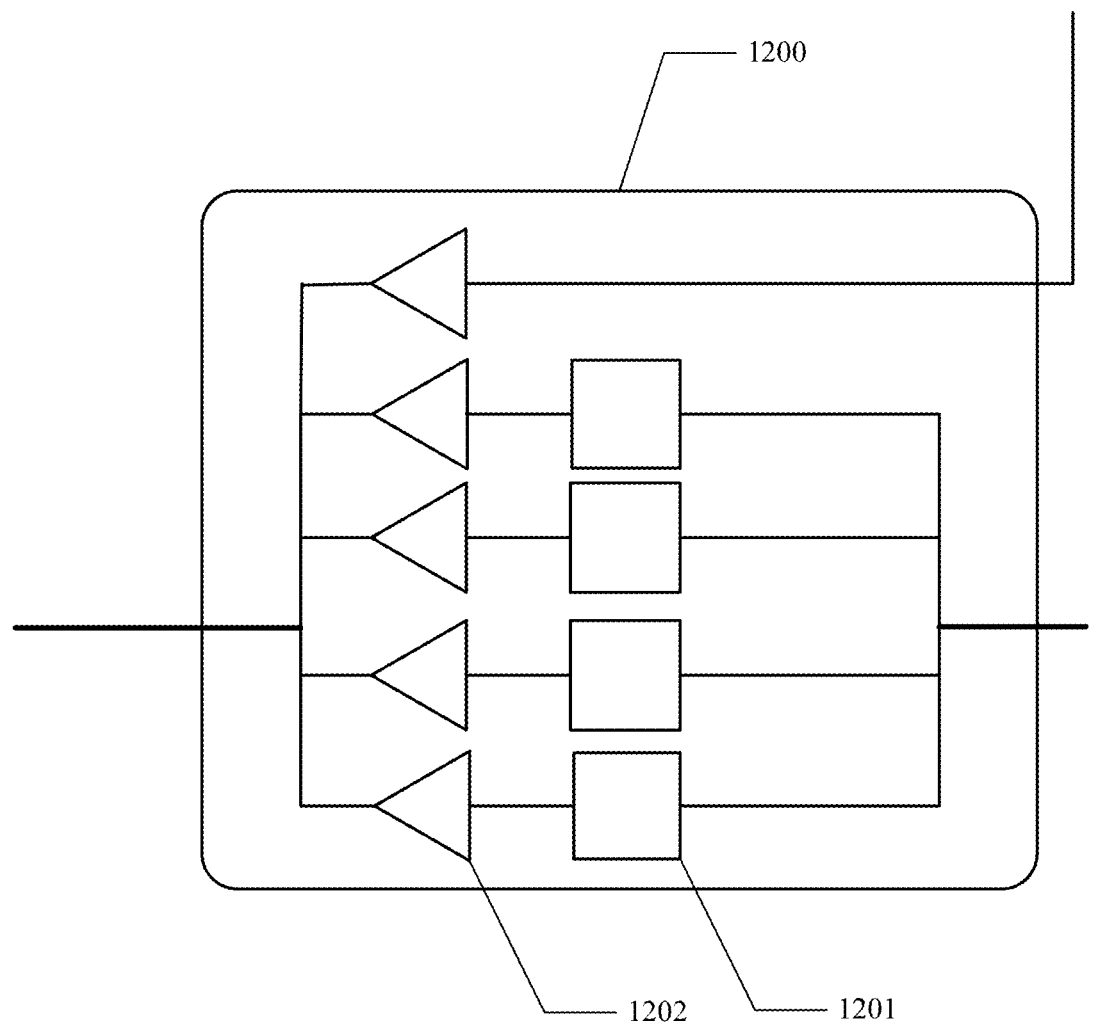
FIG. 12 is a schematic diagram of a structure of a combination of a multiplexer and an adjustable gain low noise amplifier according to an embodiment of this application.

Refer to FIG. 12. Based on the RRUs in FIG. 4 to FIG. 11, an embodiment of this application further provides a combination manner of a multiplexer and an adjustable gain low noise amplifier.

Adjustable gain low noise amplifiers 1202 are integrated after filters 1201 of filtering channels of different frequency bands in the multiplexer 1200, to improve a receiving noise coefficient. A wideband low noise amplifier is removed, and a signal directly enters a radio frequency integrated chip after passing through the multiplexer 1200.

Refer to FIG. 12. Based on the RRUs in FIG. 4 to FIG. 11, this embodiment of this application further provides a combination manner of a multiplexer and a wideband low noise amplifier.

Figure 13:
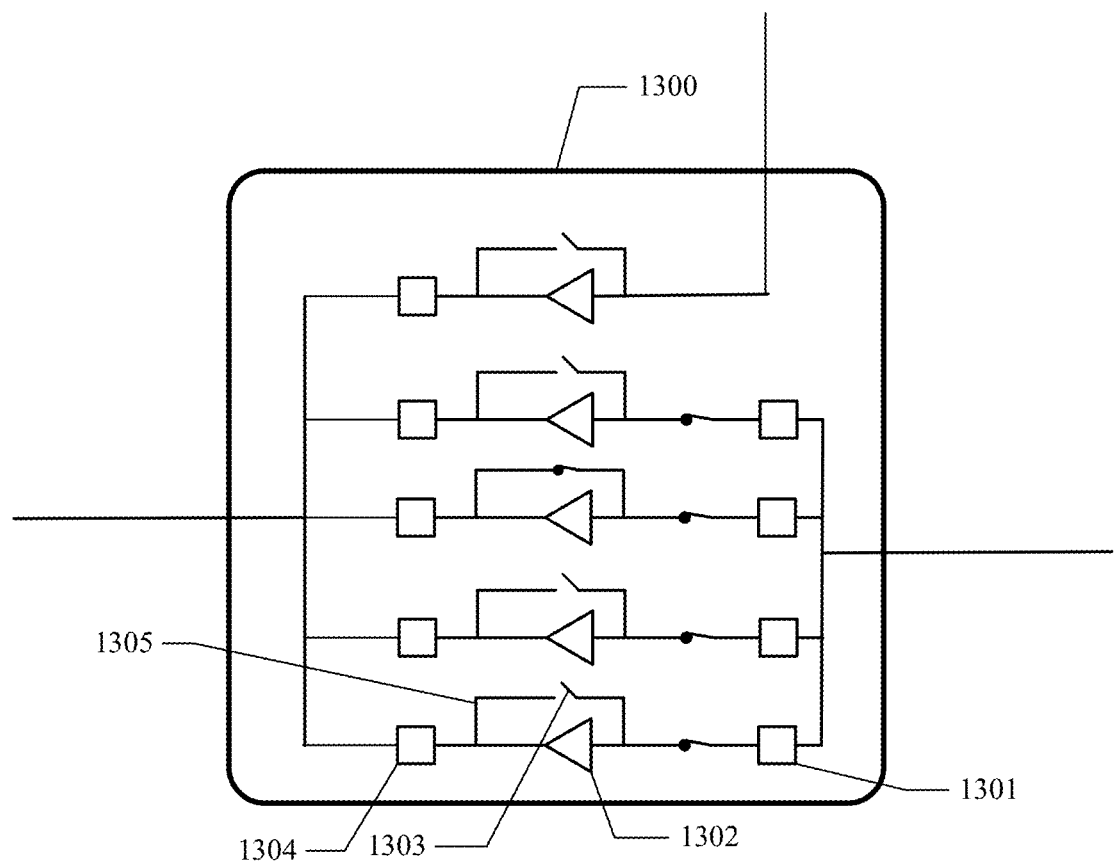
FIG. 13 is another schematic diagram of a structure of a multiplexer according to an embodiment of this application.

Referring to FIG. 13, a multiplexer in an embodiment of this application may alternatively use an architecture similar to that of the multiplexer 1300. Wideband low noise amplifiers 1302 are integrated after filters 1301 of filtering channels of different frequency bands in the multiplexer 1300, and a bypass optional circuit 1305 is added to the wideband low noise amplifier 1302. In this way, when signal power of a target frequency band is excessively large, a switch 1303 on the bypass optional circuit 1305 is switched on, and a signal of the target frequency band is not amplified by the wideband low noise amplifier 1302; or when signal power of a target frequency band is excessively small, a switch 1303 on the bypass optional circuit 1305 is switched off, and a signal of the frequency band is amplified by the wideband low noise amplifier 1302, so that powers of signals of all frequency bands are close to each other. Alternatively, a filter 1304 may be further connected after each wideband low noise amplifier 1302. This is not limited herein, and the filter is configured to further filter a signal.

In some embodiments, based on the multiplexers in FIG. 4 to FIG. 11, a body acoustic wave filter or a surface acoustic wave filter may alternatively be used inside the multiplexer to reduce an insertion loss.

Figure 14:
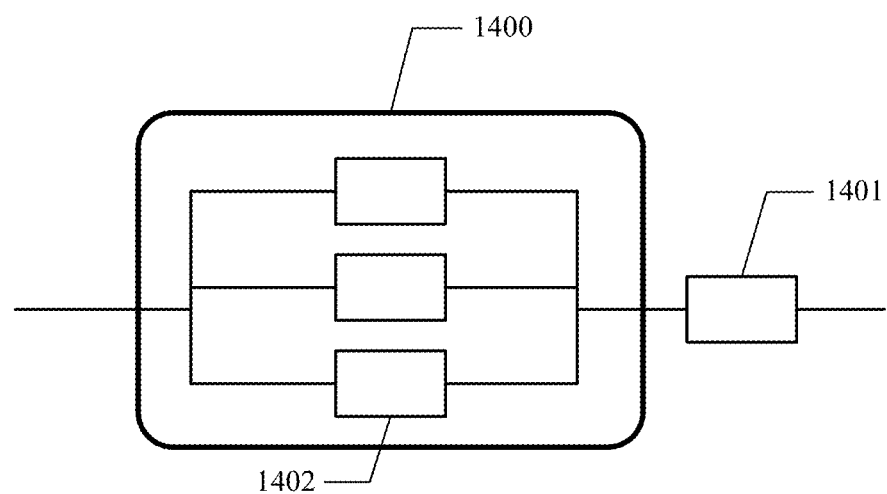
FIG. 14 is a schematic diagram of a structure of a combination of a band stop filter and a multiplexer according to an embodiment of this application.

Referring to FIG. 14, based on the multiplexers in FIG. 4 to FIG. 11, when a body acoustic wave filter 1402 or a surface acoustic wave filter 1402 is used inside a multiplexer 1400 in an embodiment of this application, a main frequency band stop filter 1401 may be added before a receive channel of the multiplexer 1400, to filter a radio frequency signal sent by a main frequency antenna.

In some embodiments, based on the multiplexers in FIG. 4 to FIG. 11, a multiplexer module may be an integrated chip, or may be a combination of a plurality of separated components.

Figure 15:
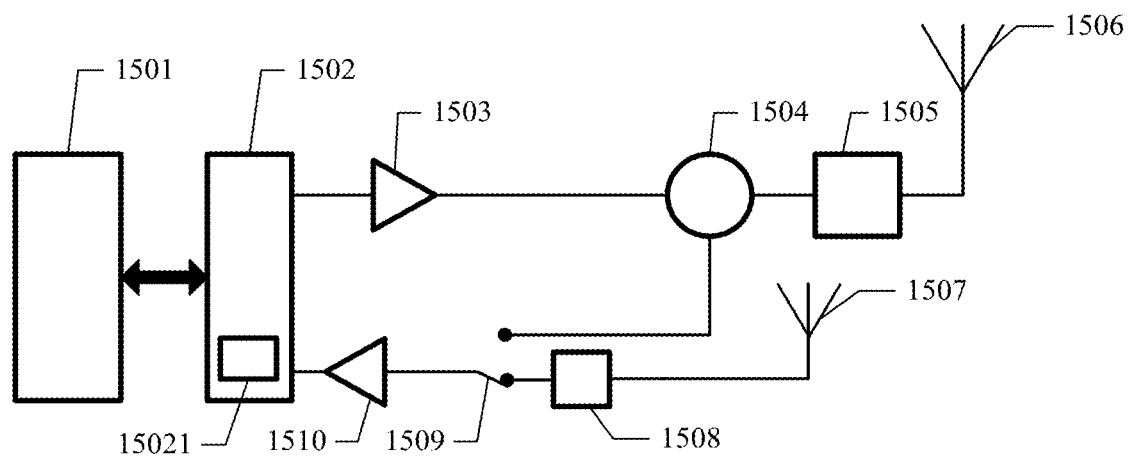
FIG. 15 is another schematic diagram of a communication system according to an embodiment of this application.

Refer to FIG. 15. An RRU and an antenna provided in an embodiment of this application may alternatively be used in another communication system. The communication system includes a digital intermediate frequency module 1501, a radio frequency integrated chip 1502, a power amplifier 1503, a circulator 1504, a main frequency filter 1505, a main frequency antenna 1506, a multi-frequency antenna 1507, a filter 1508, a single-pole double-throw switch 1509, and a wideband low noise amplifier 1510, where the radio frequency integrated chip 1502 further includes a radio frequency analog-to-digital converter 15021.

It should be noted that, in the communication system, the RRU includes the digital intermediate frequency module 1501, the radio frequency integrated chip 1502, the power amplifier 1503, the circulator 1504, the main frequency filter 1505, the filter 1508, the single-pole double-throw switch 1509, and the wideband low noise amplifier 1510, where the radio frequency integrated chip 1502 further includes the radio frequency analog-to-digital converter 15021.

The antenna includes the main frequency antenna 1506 and the multi-frequency antenna 1507.

It should be noted that the foregoing classification is merely an example. In actual application, there may be another classification manner. For example, some modules may be classified as antennas. This is not limited in this application herein.

The following describes the communication system by using a downlink slot as an example.

The digital intermediate frequency module 1501 is configured to: convert a baseband signal sent by a base station into a digital intermediate frequency signal, and send the digital intermediate frequency signal to the radio frequency integrated chip 1502, where a frequency of the baseband signal is a frequency of a main frequency band.

The radio frequency analog-to-digital converter 15021 in the radio frequency integrated chip 1502 is configured to: convert the digital intermediate frequency signal into a radio frequency signal, and send the radio frequency signal to the power amplifier 1503.

The power amplifier 1503 is configured to perform power amplification on the radio frequency signal, and send the radio frequency signal to the circulator 1504.

The circulator 1504 is configured to transmit the radio frequency signal to the main frequency filter 1505.

The main frequency filter 1505 is configured to: filter the radio frequency signal, and send the radio frequency signal to the main frequency antenna 1506.

The main frequency antenna 1506 is configured to transmit the radio frequency signal to free space, and the radio frequency signal is transmitted to user equipment through the free space. It should be noted that the radio frequency signal is a main frequency downlink signal.

The multi-frequency antenna 1507 is configured to: receive an uplink signal sent by the user equipment, where the uplink signal includes a signal of a target frequency band in N frequency bands, and send the uplink signal to the filter 1508, where the N frequency bands are scattered frequency bands, and the multi-frequency antenna 1507 may be a wideband antenna.

The filter 1508 is configured to filter the uplink signal, to obtain a filtered uplink signal, and send the filtered uplink signal to the wideband low noise amplifier 1510.

The single-pole double-throw switch 1509 is configured to connect the filter 1508 and the wideband low noise amplifier 1510.

The wideband low noise amplifier 1509 is configured to: amplify the filtered uplink signal, to obtain an amplified filtered uplink signal, and send the amplified filtered uplink signal to the radio frequency integrated chip 1502.

The radio frequency analog-to-digital converter 15021 in the radio frequency integrated chip 1502 is configured to: convert the amplified filtered uplink signal into a digital intermediate frequency signal, and send the digital intermediate frequency signal to the digital intermediate frequency module 1501.

The digital intermediate frequency module 1501 is configured to process the digital intermediate frequency signal.

The following describes the communication system in this embodiment of this application by using an uplink slot as an example.

In the uplink slot, the single-pole double-throw switch 1509 is configured to connect the wideband low noise amplifier 1510, the circulator 1504, and the main frequency filter 1506.

The main frequency antenna 1506 is further configured to: receive a main frequency uplink signal sent by the user equipment, and send the main frequency uplink signal to the main frequency filter 1505, where a frequency of the main frequency uplink signal is a frequency of a main frequency band.

The main frequency filter 1505 is further configured to filter the main frequency uplink signal, to obtain a filtered main frequency uplink signal.

The circulator 1504 is further configured to transmit the filtered main frequency uplink signal to the wideband low noise amplifier 1510.

The wideband low noise amplifier 1510 is further configured to: amplify the filtered main frequency uplink signal, to obtain an amplified filtered main frequency uplink signal, and send the amplified filtered main frequency uplink signal to the radio frequency integrated chip 1502.

The radio frequency analog-to-digital converter 15021 in the radio frequency integrated chip 1502 is configured to: convert the amplified filtered main frequency uplink signal into a digital intermediate frequency signal, and send the digital intermediate frequency signal to the digital intermediate frequency module 1501.

The digital intermediate frequency module 1501 is configured to process the digital intermediate frequency signal.

In this embodiment of this application, in a downlink slot, the base station may flexibly select a frequency band in scattered frequency bands to receive an uplink signal sent by the user equipment. In an uplink slot, the base station may receive, over a main frequency band, a main frequency uplink signal sent by the user equipment. This fully utilizes an idle receiving resource in the downlink slot, and reduces a latency. In addition, an uplink signal may also be received in the uplink slot over a scattered frequency band, and therefore an uplink rate is improved. Because in the scattered frequency bands, there are a low frequency band and a medium frequency band, for example, a low frequency band of 700 MHz or 900 MHz, and signal transmission over the low frequency band has characteristics of a low path loss and a strong propagation capability, an uplink coverage problem of the original TDD standard can be resolved.

Figure 16:
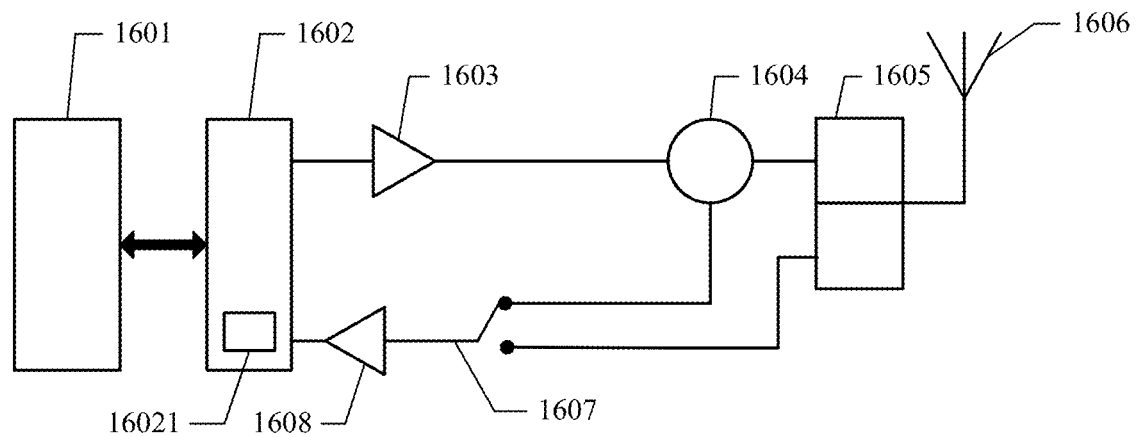
FIG. 16 is another schematic diagram of a communication system according to an embodiment of this application.

Refer to FIG. 16. An RRU and an antenna provided in an embodiment of this application may be used in another communication system. The communication system includes a digital intermediate frequency module 1601, a radio frequency integrated chip 1602, a power amplifier 1603, a circulator 1604, an antenna 1606, a duplexer 1605, a single-pole double-throw switch 1607, and a wideband low noise amplifier 1608, where the radio frequency integrated chip 1602 further includes a radio frequency analog-to-digital converter 16021.

It should be noted that, in the communication system, the RRU includes the digital intermediate frequency module 1601, the radio frequency integrated chip 1602, the power amplifier 1603, the circulator 1604, the duplexer 1605, the single-pole double-throw switch 1607, and the wideband low noise amplifier 1608, where the radio frequency integrated chip 1602 further includes the radio frequency analog-to-digital converter 16021.

The antenna 1606 includes a main frequency antenna and a multi-frequency antenna, and the main frequency antenna and the multi-frequency antenna correspond to one antenna unit.

It should be noted that the foregoing classification is merely an example. In actual application, there may be another classification manner. For example, some modules may be classified as antennas. This is not limited in this application herein.

The following describes the communication system in this embodiment of this application by using a downlink slot as an example.

The digital intermediate frequency module 1601 is configured to: convert a baseband signal sent by a base station into a digital intermediate frequency signal, and send the digital intermediate frequency signal to the radio frequency integrated chip 1602, where a frequency of the baseband signal is a frequency of a main frequency band.

The radio frequency analog-to-digital converter 16021 in the radio frequency integrated chip 1602 is configured to: convert the digital intermediate frequency signal into a radio frequency signal, and send the radio frequency signal to the power amplifier 1603.

The power amplifier 1603 is configured to perform power amplification on the radio frequency signal, and send the radio frequency signal to the circulator 1604.

The circulator 1604 is configured to transmit the radio frequency signal to the duplexer 1605.

The duplexer 1605 is configured to: filter the radio frequency signal, and send the radio frequency signal to the antenna 1606.

The antenna 1606 is configured to send a filtered radio frequency signal to free space, and the radio frequency signal is transmitted to user equipment through the free space. It should be noted that the radio frequency signal is a main frequency downlink signal.

The antenna 1606 is configured to: receive an uplink signal sent by the user equipment, where the uplink signal includes a signal of a target frequency band in N frequency bands, and send the uplink signal to the duplexer 1605, where the N frequency bands are scattered frequency bands, and the antenna 1606 may be a wideband antenna.

The duplexer 1605 is further configured to: filter the uplink signal, to obtain a filtered uplink signal, and send the filtered uplink signal to the wideband low noise amplifier 1608.

The single-pole double-throw switch 1607 is configured to connect the duplexer 1605 and the wideband low noise amplifier 1608.

The wideband low noise amplifier 1608 is configured to: amplify the filtered uplink signal, to obtain an amplified filtered uplink signal, and send the amplified filtered uplink signal to the radio frequency integrated chip 1602.

The radio frequency analog-to-digital converter 16021 in the radio frequency integrated chip 1602 is configured to: convert the amplified filtered uplink signal into a digital intermediate frequency signal, and send the digital intermediate frequency signal to the digital intermediate frequency module 1601.

The digital intermediate frequency module 1601 is configured to process the digital intermediate frequency signal.

Refer to FIG. 16. The following describes the communication system by using an uplink slot as an example.

The antenna 1606 is further configured to: receive a main frequency uplink signal sent by the user equipment, and send the main frequency uplink signal to the duplexer 1605, where a frequency of the main frequency uplink signal is a frequency of a main frequency band.

The duplexer 1605 is further configured to: filter the main frequency uplink signal, to obtain a filtered main frequency uplink signal, and send the filtered main frequency uplink signal to the wideband low noise amplifier 1608.

The single-pole double-throw switch 1607 is further configured to connect the duplexer 1605, the circulator 1604, and the wideband low noise amplifier 1608.

The wideband low noise amplifier 1608 is further configured to: amplify the filtered main frequency uplink signal, to obtain an amplified filtered main frequency uplink signal, and send the amplified filtered main frequency uplink signal to the radio frequency integrated chip 1602.

The radio frequency analog-to-digital converter 16021 in the radio frequency integrated chip 1602 is further configured to: convert the amplified filtered main frequency uplink signal into a digital intermediate frequency signal, and send the digital intermediate frequency signal to the digital intermediate frequency module 1601.

The digital intermediate frequency module 1601 is further configured to process the digital intermediate frequency signal.

In this embodiment of this application, in a downlink slot, the base station may flexibly select a frequency band in scattered frequency bands to receive an uplink signal sent by the user equipment. In an uplink slot, the base station may receive, over a main frequency band, a main frequency uplink signal sent by the user equipment. This fully utilizes an idle receiving resource in the downlink slot, and reduces a latency. In addition, an uplink signal may also be received in the uplink slot over a scattered frequency band, and therefore an uplink rate is improved. Because in the scattered frequency bands, there are a low frequency band and a medium frequency band, for example, a low frequency band of 700 MHz or 900 MHz, and signal transmission using the low frequency band has characteristics of a low path loss and a strong propagation capability, an uplink coverage problem of the original TDD standard can be resolved.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic, a mechanical, or another form.

The units described as separate parts may or may not be physically separate. Parts displayed as units may or may not be physical units, in other words, may be located in one position, or may be distributed on a plurality of network units. Some or all of the units may be selected based on an actual requirement to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A radio frequency unit, comprising:
   a multiplexer;
   a low noise amplifier;
   a radio frequency analog-to-digital converter; and
   a digital intermediate frequency module, wherein
      the multiplexer comprises N filters, wherein N is an integer greater than 1;
      the multiplexer is configured to filter an uplink signal from an antenna in a downlink slot to obtain a filtered uplink signal, wherein the uplink signal comprises signals of N frequency bands;
      the low noise amplifier is configured to amplify the filtered uplink signal to obtain an amplified filtered uplink signal;
      the radio frequency analog-to-digital converter is configured to convert the amplified filtered uplink signal into a first digital intermediate frequency signal; and
      the digital intermediate frequency module is configured to process the first digital intermediate frequency signal.

2. The radio frequency unit according to claim 1, wherein the radio frequency unit further comprises a main frequency filter, wherein
   the main frequency filter is configured to filter a main frequency uplink signal from the antenna in an uplink slot to obtain a filtered main frequency uplink signal, wherein the main frequency uplink signal is a signal of a main frequency band;
   the multiplexer is further configured to filter the uplink signal in the uplink slot to obtain the filtered uplink signal;
   the low noise amplifier is configured to amplify the filtered uplink signal and the uplink signal to obtain the amplified filtered uplink signal and an amplified filtered main frequency uplink signal;
   the radio frequency analog-to-digital converter is configured to convert the amplified filtered uplink signal and the amplified filtered main frequency uplink signal into a second digital intermediate frequency signal; and
   the digital intermediate frequency module is configured to process the second digital intermediate frequency signal.

3. The radio frequency unit according to claim 1, wherein the radio frequency unit further comprises a single-pole multi-throw switch, wherein
   the single-pole multi-throw switch is configured to connect a target filter in the multiplexer in the downlink slot, wherein the target filter is configured to filter a signal of a target frequency band in the uplink signal to obtain a target uplink filtered signal;
   the low noise amplifier is further configured to amplify the target uplink filtered signal to obtain an amplified target uplink filtered signal;
   the radio frequency analog-to-digital converter is configured to convert the amplified target uplink filtered signal into a third digital intermediate frequency signal; and
   the digital intermediate frequency module is configured to process the third digital intermediate frequency signal.

4. The radio frequency unit according to claim 1, wherein the low noise amplifier comprises any one of a wideband low noise amplifier and an adjustable gain amplifier set; and
   there is a correspondence between each adjustable gain amplifier in the adjustable gain amplifier set and each filter in the N filters.

5. The radio frequency unit according to claim 1, wherein the radio frequency unit is used in a frequency division duplex FDD system, the radio frequency unit further comprising:
   a power amplifier; and
   a duplexer, wherein
      the duplexer is configured to filter a main frequency uplink signal from the antenna to obtain a filtered main frequency uplink signal, wherein the main frequency uplink signal is a signal of a first main frequency band;

the low noise amplifier is configured to amplify the filtered uplink signal and the main frequency uplink signal to obtain the amplified filtered uplink signal and an amplified main frequency uplink signal; and the radio frequency analog-to-digital converter is configured to convert the amplified filtered uplink signal and the amplified main frequency uplink signal into the first digital intermediate frequency signal.

6. The radio frequency unit according to claim 5, wherein the digital intermediate frequency module is further configured to convert a baseband signal into a second digital intermediate frequency signal;

the radio frequency analog-to-digital converter is further configured to convert the second digital intermediate frequency signal into a radio frequency signal;

the power amplifier is configured to amplify the radio frequency signal to obtain an amplified radio frequency signal; and the duplexer is configured to filter the amplified radio frequency signal to obtain a main frequency downlink signal, wherein the main frequency downlink signal is a signal of a second main frequency band.

7. The radio frequency unit according to claim 6, wherein the low noise amplifier comprises any one of a wideband low noise amplifier and an adjustable gain amplifier set; and there is a correspondence between each adjustable gain amplifier in the adjustable gain amplifier set and each filter in the N filters.

8. The radio frequency unit according to claim 1, further comprising:

a main frequency antenna; and a multi-frequency antenna, wherein the multi-frequency antenna is configured to:

receive the uplink signal in the downlink slot; and receive the uplink signal in an uplink slot; and the main frequency antenna is configured to send a main frequency downlink signal in the downlink slot, wherein the main frequency downlink signal is a signal of a main frequency band.

9. The radio frequency unit according to claim 8, wherein the multi-frequency antenna comprises N independent antenna units, the N independent antenna units correspond to N antenna ports, and there is a correspondence between the N independent antenna units and the signals of the N frequency bands in the uplink signal.

10. The radio frequency unit according to claim 8, wherein the multi-frequency antenna comprises a first antenna and a second antenna, wherein the first antenna comprises one antenna unit, and the second antenna comprises (N-M) antenna units;

the first antenna is configured to receive signals of M frequency bands in the signals of the N frequency bands, wherein the signals of the M frequency bands correspond to a same antenna port, or the signals of the M frequency bands correspond to M different antenna ports, and M is an integer greater than or equal to 2; and the second antenna is configured to receive signals of (N-M) frequency bands in the signals of the N frequency bands, wherein the signals of the (N-M) frequency bands correspond to (N-M) different antenna ports.

11. The radio frequency unit according to claim 8, wherein the multi-frequency antenna comprises a first antenna and a second antenna, wherein the first antenna and the main frequency antenna correspond to a same antenna unit, the first antenna is configured to receive signals of S frequency bands in the signals of the N frequency bands, the signals of the S frequency bands correspond to a same antenna port, or the signals of the S frequency bands correspond to S different antenna ports, and S is an integer greater than or equal to 1; and the second antenna comprises (N-S) antenna units, and the second antenna is configured to receive signals of (N-S) frequency bands in the signals of the N frequency bands, wherein the signals of the (N-S) frequency bands correspond to (N-S) different antenna ports.

12. A signal processing method, comprising:

filtering an uplink signal from an antenna in a downlink slot to obtain a filtered uplink signal, wherein the uplink signal comprises signals of N frequency bands, and N is an integer greater than 1;

amplifying the filtered uplink signal to obtain an amplified filtered uplink signal;

converting the amplified filtered uplink signal into a first digital intermediate frequency signal; and processing the first digital intermediate frequency signal.

13. The method according to claim 12, wherein the method further comprises:

filtering a main frequency uplink signal and the uplink signal that are from the antenna in an uplink slot to obtain a filtered main frequency uplink signal and the filtered uplink signal, wherein the main frequency uplink signal is a signal of a main frequency band;

amplifying the filtered main frequency uplink signal and the filtered uplink signal to obtain the amplified filtered uplink signal and an amplified filtered main frequency uplink signal;

converting the amplified filtered uplink signal and the amplified filtered main frequency uplink signal into a second digital intermediate frequency signal; and processing the second digital intermediate frequency signal.

14. The method according to claim 12, wherein the method further comprises:

filtering a signal of a target frequency band in the uplink signal from the antenna in the downlink slot to obtain a target uplink filtered signal;

amplifying the target uplink filtered signal to obtain an amplified target uplink filtered signal;

converting the amplified target uplink filtered signal into a third digital intermediate frequency signal; and processing the third digital intermediate frequency signal.

15. The method according to claim 12, wherein the method is applied to a radio frequency unit.

16. A communication system, wherein the communication system comprises:

a radio frequency unit, comprising:

a multiplexer;

a low noise amplifier;

a radio frequency analog-to-digital converter; and a digital intermediate frequency module, wherein the multiplexer comprises N filters, wherein N is an integer greater than 1;

the multiplexer is configured to filter an uplink signal from an antenna in a downlink slot to obtain a filtered uplink signal, wherein the uplink signal comprises signals of N frequency bands;

the low noise amplifier is configured to amplify the filtered uplink signal to obtain an amplified filtered uplink signal;

the radio frequency analog-to-digital converter is configured to convert the amplified filtered uplink signal into a first digital intermediate frequency signal; and the digital intermediate frequency module is configured to process the first digital intermediate frequency signal.

17. The communication system of claim 16, wherein the radio frequency unit further comprises a main frequency filter, wherein the main frequency filter is configured to filter a main frequency uplink signal from the antenna in an uplink slot to obtain a filtered main frequency uplink signal, wherein the main frequency uplink signal is a signal of a main frequency band;

the multiplexer is further configured to filter the uplink signal in the uplink slot to obtain the filtered uplink signal;

the low noise amplifier is configured to amplify the filtered uplink signal and the uplink signal to obtain the amplified filtered uplink signal and an amplified filtered main frequency uplink signal;

the radio frequency analog-to-digital converter is configured to convert the amplified filtered uplink signal and the amplified filtered main frequency uplink signal into a second digital intermediate frequency signal; and the digital intermediate frequency module is configured to process the second digital intermediate frequency signal.

18. The communication system of claim 16, wherein the radio frequency unit further comprises a single-pole multi-throw switch, wherein the single-pole multi-throw switch is configured to connect a target filter in the multiplexer in the downlink slot, wherein the target filter is configured to filter a signal of a target frequency band in the uplink signal to obtain a target uplink filtered signal;

the low noise amplifier is further configured to amplify the target uplink filtered signal to obtain an amplified target uplink filtered signal;

the radio frequency analog-to-digital converter is configured to convert the amplified target uplink filtered signal into a third digital intermediate frequency signal; and the digital intermediate frequency module is configured to process the third digital intermediate frequency signal.

19. The communication system of claim 16, wherein the low noise amplifier comprises any one of a wideband low noise amplifier and an adjustable gain amplifier set; and there is a correspondence between each adjustable gain amplifier in the adjustable gain amplifier set and each filter in the N filters.

20. The communication system of claim 16, further comprising:

a duplexer, wherein the duplexer is configured to filter a main frequency uplink signal from the antenna to obtain a filtered main frequency uplink signal, wherein the main frequency uplink signal is a signal of a first main frequency band.

* * * * *